(12) United States Patent
Kim et al.

(10) Patent No.: US 8,791,592 B2
(45) Date of Patent: Jul. 29, 2014

(54) AIR CONDITIONER AND METHOD FOR CONTROLLING THE SAME

(75) Inventors: Younggeul Kim, Changwon-si (KR);
Namwoo Kwon, Changwon-si (KR);
Jeonghyun Lim, Changwon-si (KR);
Suyoung Kang, Changwon-si (KR);
Juyoung Min, Changwon-si (KR)

(73) Assignee: LG Electronics Inc., Seoul (KR)

( * ) Notice: Subject to any disclaimer, the term of this patent is extended or adjusted under 35 U.S.C. 154(b) by 995 days.

(21) Appl. No.: 12/845,389

(22) Filed: Jul. 28, 2010

(65) Prior Publication Data

US 2012/0023977 A1 Feb. 2, 2012

(51) Int. Cl.
*H02J 7/00* (2006.01)

(52) U.S. Cl.
USPC .................................. 307/29; 307/23; 307/25

(58) Field of Classification Search
USPC ................................................ 307/29, 23, 25
See application file for complete search history.

(56) References Cited

U.S. PATENT DOCUMENTS

| 5,331,825 | A * | 7/1994 | Kim ............................. 62/180 |
| 8,477,094 | B2 * | 7/2013 | Jung et al. ..................... 345/100 |
| 2008/0209927 | A1 * | 9/2008 | Igarashi et al. ................ 62/129 |
| 2009/0127932 | A1 * | 5/2009 | Warren et al. .................. 307/64 |
| 2012/0023976 | A1 * | 2/2012 | Kim et al. ....................... 62/89 |
| 2012/0023977 | A1 * | 2/2012 | Kim et al. ....................... 62/89 |

* cited by examiner

*Primary Examiner* — Fritz M Fleming
(74) *Attorney, Agent, or Firm* — KED & Associates, LLP (57) ABSTRACT

An air conditioner which may controlled to adapt to changes in power rates, and an associated method, are provided. The method may include receiving electric power information, determining whether a current power rate included in the received information is higher than a preset reference value, and supplying electric power from a supplementary electric power source to at least one appliance in a network to which the air conditioner is connected if the current power rate is higher than the preset reference value.

20 Claims, 7 Drawing Sheets

AIR CONDITIONER AND METHOD FOR CONTROLLING THE SAME

BACKGROUND

1. Field

This relates to an air conditioner and a method for controlling the same.

2. Background

An air conditioner may supply heated or cooled air to a designated space to adjust a temperature of the space, and may also clean/humidify the air in the space. The air conditioner may include indoor and outdoor heat exchangers, a fan, and a compressor which may consume a relatively large amount of power.

BRIEF DESCRIPTION OF THE DRAWINGS

The embodiments will be described in detail with reference to the following drawings in which like reference numerals refer to like elements wherein.

DETAILED DESCRIPTION

In view of saving energy and associated cost, a smart grid may make an effective use of power. Basically, the smart grid may be employed together with a variable power rate system in which the power rate may vary based on power demands. Under such a variable power rate system, the power rate per unit time period may increase substantially in a time period in which the power demand is great (i.e., a peak period), and the power rate per unit time period may be lower in a time period in which the power demand is relatively low (i.e., a non-peak period). Because an air conditioner consumes a relatively large amount of power, the air conditioner may be controlled based on the variable power rate to reduce power consumption and related operating costs of the air conditioner.

Figure 1:
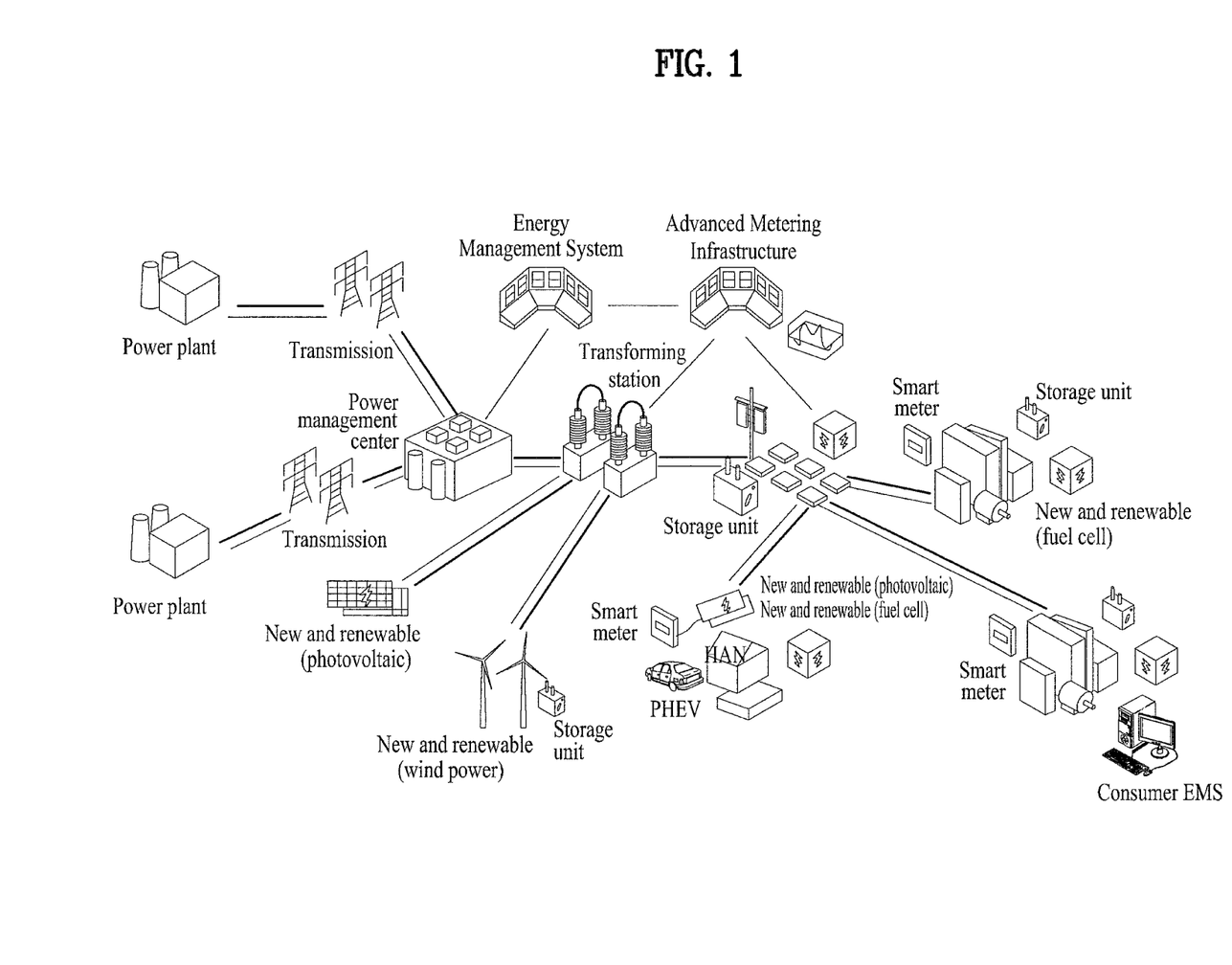
FIG. 1 is a schematic view of an exemplary smart grid.

As shown in FIG. 1, a smart grid may include conventional electric power plants that generate electric power by means of thermal power generation, nuclear power generation, or hydraulic power generation, and solar photovoltaic power generation plants and wind power plants which use renewable energy sources such as solar photovoltaic power or wind power.

The conventional electric power plant may transmit electric power to a power management center, and the power management center may transmit the electric power to a transforming station, and therefrom to consumer facilities, such as homes, offices, factories and the like. The electric power produced from the new and renewable energy sources may also be transmitted to the transforming station and distributed therefrom to the consumers. In such an electric power distribution system, the electric power may be distributed from the transforming station to the offices or homes through electric power storage devices.

A home in a HAN (Home Area Network) may also produce and supply electric power for itself by means of, for example, solar photovoltaic power, which is renewable energy, or a fuel cell that may be, for example, part of a PHEV (Plug in Hybrid Electric Vehicle), and may sell any unused electric power back to the power plants. The offices or the homes may have measuring devices (hereafter referred to as smart meters) that measure electric power and power rates being used in real time, allowing consumers to adapt usage so as to reduce power consumption or cost (based on power rates) according to the present situation. This bidirectional communication between the power plants, the power management center, the storage devices, and the consumers, allows the consumers to have electric power supplied thereto in one direction, and may also provide consumer information to the storage devices, the power management center, and the power plants so that electric power production and electric power distribution may be performed based on needs of the consumers.

The smart grid may include an EMS (Energy Management System) for real time consumer electric power management and real time forecasting of power demand, and an AMI (Advanced Metering Infrastructure) for real time measurement of electric power consumption. The EMS and AMI play central roles in the smart grid. The AMI, which is based on an open architecture, allows the consumer to use electric power efficiently, and allows the electric power provider to efficiently detect system problems for managing the system. Different from a general communication network, the open architecture allows electric appliances under the control of one consumer, such as, for example, all of the domestic appliances in one home, to be connected to one another within the smart grid regardless of individual (different) manufacturers thereof. Therefore, the AMI used in the smart grid makes consumer friendly concepts and functions, such as "Prices to Devices" possible.

It is noted that, simply for ease of discussion, the consumer facility will be assumed to be a home, and the electric appliances to be managed by the smart grid will be electric household/domestic appliances. However, it is well understood that the principles and concepts set forth herein may be applied to numerous different types of consumer facilities (offices, factories, stores, schools and the like) and associated electric devices used therein.

In more detail, information related to electric power (hereafter, electric power information), particularly, the power rate information which varies with a total demand, is provided to the EMS (Energy Management System or Energy Management Server) and the smart meter provided at each consumer facility from elements of the smart grid positioned outside of the facilities. Moreover, the EMS and the smart meter provided in, for example, each home, may communicate with the electric appliances in the home and may be provided with information on power consumption from the appliances.

If such information exchange is taken into account, the electric power information may be defined such that the electric power information includes wattage supplied to the home and the variable power rate provided by the power plants and the power management center (external electric power information), and the used wattage measured in relation to the domestic appliances in the home and the actual power rates to be charged based on the used wattage (internal electric power information). Furthermore, since the supplied wattage and the power rates are provided from elements of the smart grid outside of the home, the supplied wattage and the power rates may be defined as "external power rates". Since used wattage and the actual power rates to be charged are provided from elements of the smart grid in the home, the used wattage and the power rates to be charged may be defined as "internal power rates". Therefore, it may be assumed that the electric power information to be treated in the home under the smart grid includes the external electric power information and the internal electric power information. The smart meter receives or measures the external and the internal electric power information, and the EMS provides the received or measured electric power information to the user, and can control the appliances based on the electric power information. These definitions will be applied to the description of embodiments presented hereinafter.

Overall electric power information is provided to the user through the EMS and the smart meter, and the user may manually control the domestic appliances based on the electric power information to save electric power and expenses related thereto. In more detail, based on the electric power information provided by the EMS and the smart meter, the user may apply an operational order to the appliances directly, or indirectly, through the EMS. Also, based on received electric power information, the EMS may control the appliances automatically based on a preset control method for saving energy and expenses related thereto. That is, the EMS and the smart meter may serve as a central controller (that is, a server) for integrated management of the appliances based on the received electric power information.

The domestic appliances may each include controllers for receiving instructions and appliance operation related information from an external source and controlling operation of the domestic appliances based on the instructions and the information. If the EMS and the smart meter are provided to the home, the controller of the domestic appliance may receive an instruction from the EMS, in addition to the instruction provided by the user directly, for controlling the domestic appliance. Furthermore, the domestic appliance may include functions of the EMS and the smart meter, in that the domestic appliance may measure the internal electric power information, receive the external electric power information, provide the measured and received electric power information to the user, and control the domestic appliance based on the measured and received electric power information. That is, the EMS and the smart meter may be integrated with each of the domestic appliances, or may be physically integrated with the controller of the domestic appliance. In such a case, each of the domestic appliances may be a stand-alone device which may directly interact with the elements of the smart grid existing outside of the home. Moreover, the domestic appliance may include a smart controlling device having all of the electric power management and control functions described before, or the controller of the domestic appliance itself may be the smart controlling device, or the domestic appliance may be connected to a central controller controlling such functions for one or more appliance.

As described before, since real time communication between the suppliers and the consumers is provided by the smart grid, "a demand response" which controls the consumer's use of electric power in response to variable power rates may be achieved. And, since the use of electric power may be controlled properly and actively, the smart grid allows the electric power company to meet peak consumer demand for electric power supply at reduced cost.

Figure 2:
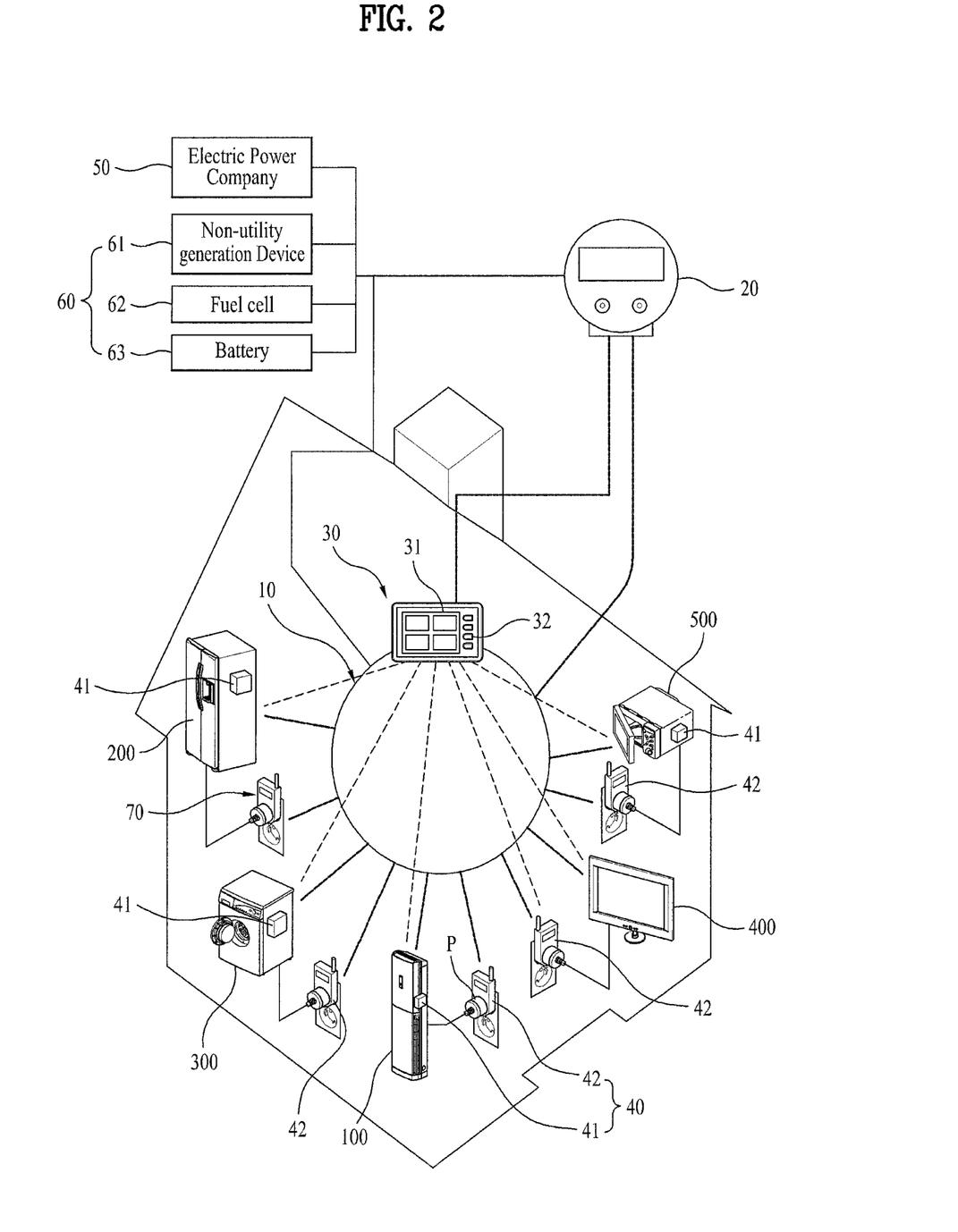
FIG. 2 is a schematic view of an exemplary electric power management network.

As shown in FIG. 2, the electric power management network 10 may include a smart meter 20 that receives electric power information, such as wattage supplied to each home and power rates from other elements of the smart grid outside of the home, and that measures, in real time, used wattage in the home and the associated power rates to be charged. In this instance, the power rate may be provided as an hourly rate, and the hourly rate may be relatively high in a time period in which use of electric power rises sharply, and may be relatively low in a time period when the use of the electric power is relatively low.

The electric power management network 10 may have an energy management system (EMS) 30 connected to the smart meter 20 for receiving electric power related information and controlling the domestic appliances while also communicating with one or more than one of the domestic appliances. The EMS 30 may be, for example, a terminal having a display 31 for displaying information, such as the electric power information, the currently used wattage and the current power rates, an outdoor environment (temperature and humidity), and an input device 32 for receiving user input. The EMS 30 may be connected to one or more domestic appliances, such as an air conditioner 100, a refrigerator 200, a washing machine and dryer 300, a television set 400, and a cooker 500, through the home network so as to have bidirectional communication with the domestic appliances. The communication in the home may be made by radio or wired communication, such as, for example, power line communication (PLC). The domestic appliances may also be connected to make other modes of communication possible. The EMS 30 and the smart meter 20 may be individual units as shown in FIG. 2, or may be integrated into one unit which performs all of the functions described above.

Figure 3:
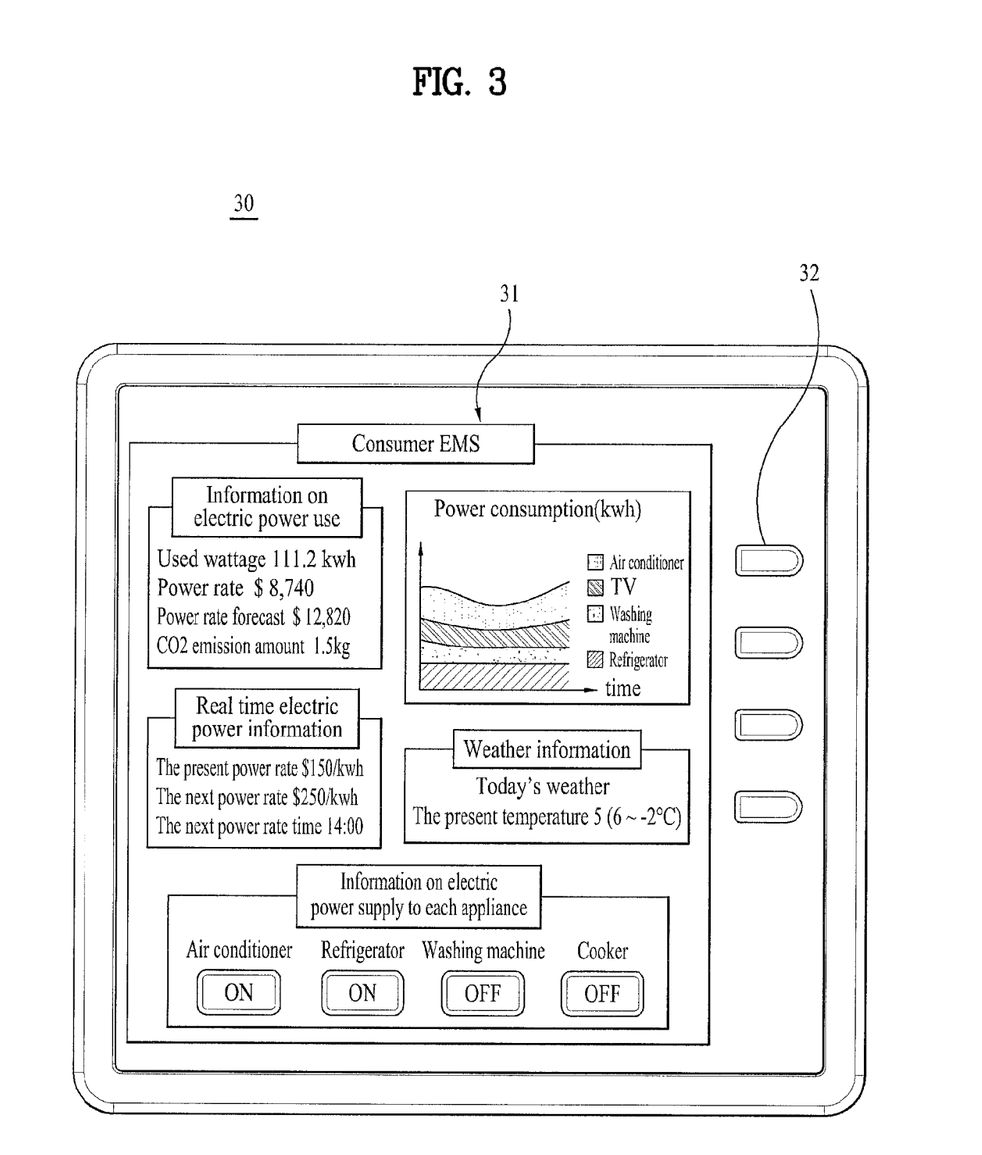
FIG. 3 is a front view of an exemplary energy management system shown in FIG. 2.

As shown in FIG. 3, the EMS 30 may include the display 31 which may display the used wattage information, such as the present used wattage, an estimated power rate and an amount of carbon dioxide emission with reference to an accumulated history, real time electric power information, such as the power rate of the present time period, the power rate of the next time period, and a time when the power rate changes, and weather information. The display 31 may also display graphs showing electric power consumption of each of the domestic appliances in each time period and changes thereof, and on/off states of each of the domestic appliances.

The display 31 may include an input device 32 that allows the user to set operation of the domestic appliances as the user requires. For example, the user may limit the allowable wattage or the power rates, and the EMS 30 may control operation of each of the domestic appliances according to the limits set by the user.

Moreover, as described above, each of the domestic appliances 100~500 may have a smart controller 40 having all of the electric power management and control functions of the smart meter and the EMS. The smart controller 40 may be provided to each home together with the smart meter 20 and the EMS 30. Moreover, since the smart meter 20/the EMS 30 and the smart controller 40 may perform substantially the same functions independent from one another, the smart controller 40 may be provided to the home without the smart meter 20 and the EMS 30, or only the smart meter 20 and the EMS 30 may be provided to the home without the smart controller 40. Each of the domestic appliances may be selectively controlled by the smart controller 40 and/or the EMS 30 based on the electric power information. If only the smart controller 40 is provided, the smart controller 40 may perform all of the functions of the smart meter 20 and the EMS 30.

The smart controller 40 may be an integrated controller 41 integrated into each of the individual domestic appliances. An integrated controller 41 may be attached to each of the domestic appliances, either on an outside thereof, or installed within. The smart controller 40 may include a smart adapter 42 placed in a plug P of each of the domestic appliances, and in an outlet 70 in the home for receiving electric power information, such as the wattage supply and the power rates, from outside of the home by using power line communication, and may measure the used wattage and the power rates to be charged based on the used wattage from the domestic appliances. The smart adapter 42 may provide such information to the user via the display, and control operation of the domestic appliances based on the electric power information.

A source of electric power to the home may be, for example, an electric power company 50 having general electric power plants (thermal, nuclear, hydraulic, and the like), or new and renewable energy sources (photovoltaic, wind, geothermal and the like). Supplementary electric power sources 60 may also serve as power supply sources. The supplementary electric power source 60 may be, for example, a non-utility generator 61 such as photovoltaic and wind power stations, or a fuel cell 62 in the home or a vehicle, or a battery 63 which may hold electric power produced from the non-utility generator 61 as a charge therein.

In general, the supplementary electric power sources 60 provide the electric power information, such as produced wattage, and charged wattage, to the smart meter 20 and the EMS 30. However, if the smart controller 40 is provided in the home, the electric power information described above may be provided to the smart controller 40 directly.

Figure 4:
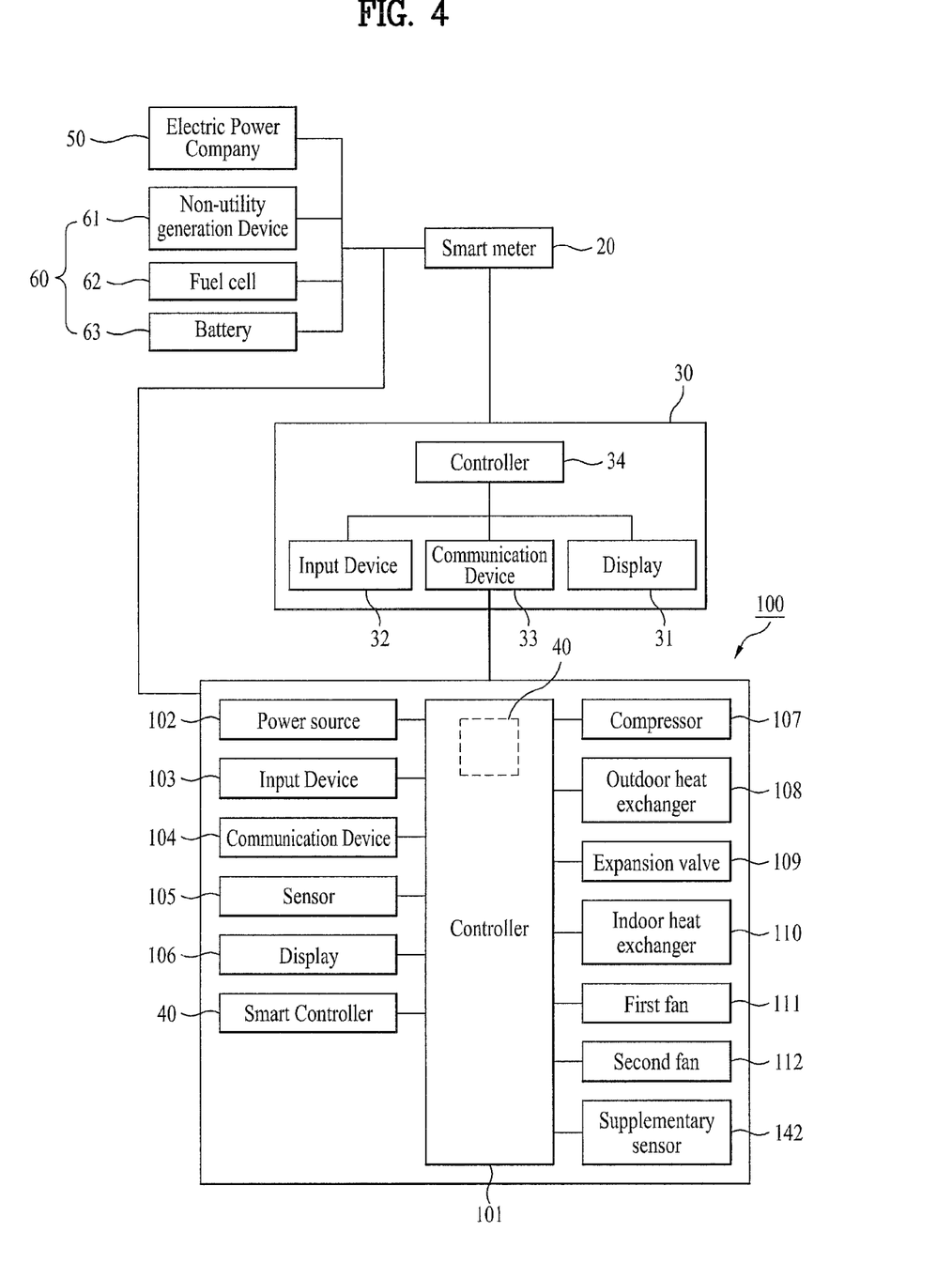
FIG. 4 is a block diagram of a power management network having an air conditioner connected thereto.
Figure 5:
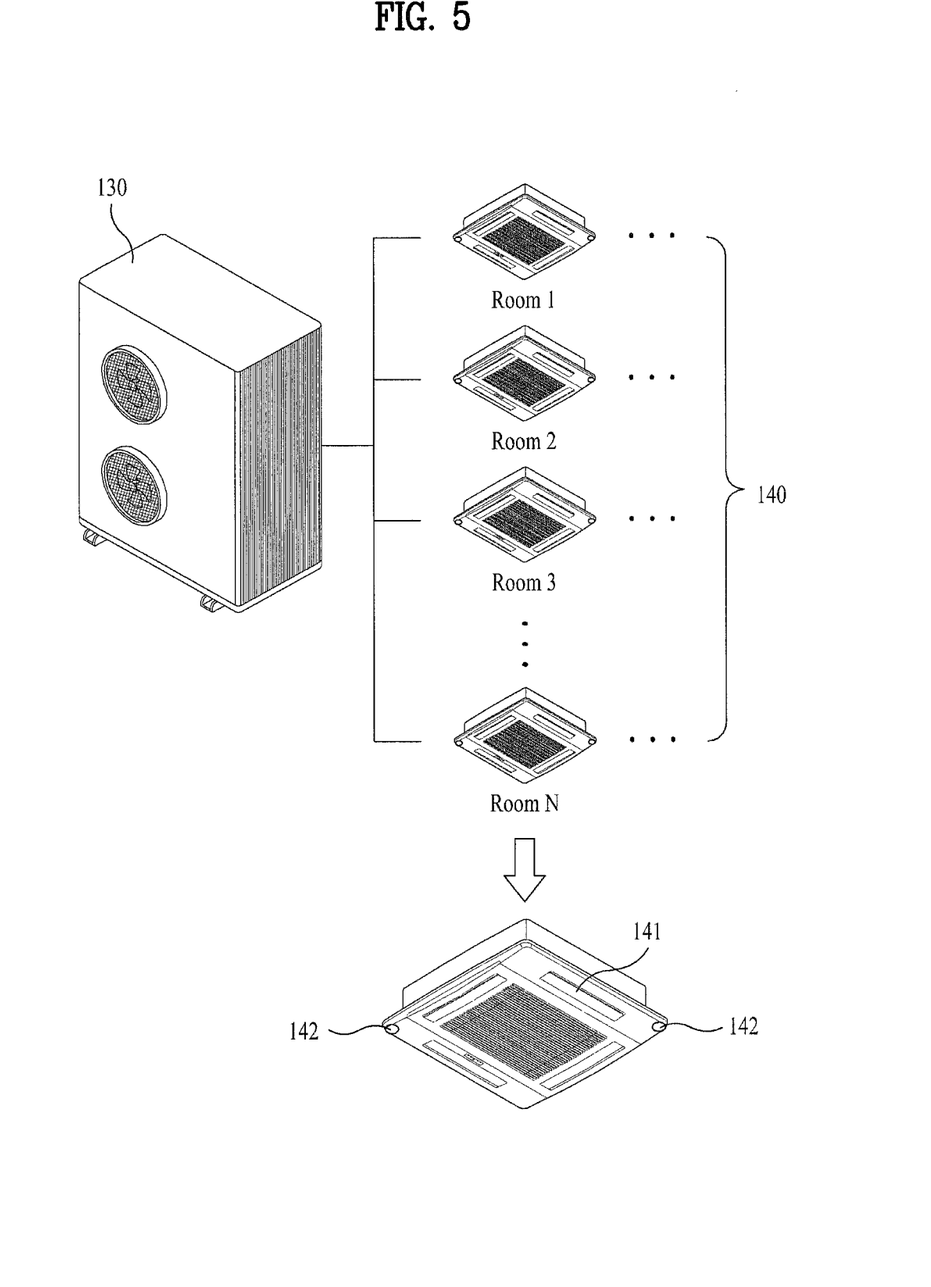
FIG. 5 illustrates an air conditioner in accordance with an embodiment as broadly described herein.

FIG. 4 is a block diagram of a domestic power management network implemented with a smart grid, and an air conditioner connected thereto, and FIG. 5 illustrates an air conditioner in accordance with an embodiment as broadly described herein.

Referring to FIG. 4, the electric power supply source may be the electric power company 50 and/or the supplementary electric power sources 60 as described above. The electric power supply source may be connected to the smart meter 20 and/or the energy management system 30, and optionally, to the smart controller 40 directly connected to the air conditioner 100 to provide for communication therewith. The functions of the power supply source and the smart meter 20 have been described in detail above.

The energy management system 30 may include a display 31, an input device 32, a communication device 33, and a controller 34.

The display 31 is substantially the same as the display 31 discussed above with respect to FIG. 3. The display 31 may display information using a UI (User Interface) or a GUI (Graphic User Interface), and may include a liquid crystal display LCD, a thin film transistor-liquid crystal display TFT LCD, an organic light-emitting diode OLED, a flexible display, or a 3D display. The display 31 may also include a touch screen that may serve as the input device 32. The display 31 may also have a module for generating an audio signal to provide an audible indicator of various events.

The input device 32 may include a key pad, a direction key, a dome switch, a touch pad (fixed voltage/static electricity), a jog wheel, a jog switch, and other such features.

The communication device 33 may communicate with the domestic appliances, including, for example, the air conditioner, and other peripheral devices as appropriate. That is, the communication device 33 may include a receiver for receiving the external and internal electric power information, and other information, and a transmitter for transmitting a control signal based on the received information and other pieces of information. The communication device 33 may have a long range communication module or a short range communication module. The long range communication module may have a module that provides wired/wireless Internet access. WLAN (Wireless LAN) (Wi-Fi), Wibro (Wireless broadband), Wimax (World Interoperability for Microwave Access), HSDPA (High Speed Downlink Packet Access), and other such technologies may provide the wireless Internet technology. RFID (Radio Frequency Identification), IrDA (Infrared Data Association), the UWB (Ultra Wideband), and ZigBee may be used for the short range communication module.

The controller 34 controls operation of the display 31, the input device, and the communication device 33. Moreover, the controller 34 may also control the domestic appliances, including the air conditioner 100, based on instructions received by the input device 32. In alternative embodiments, the controller 34 may control the domestic appliances in accordance with a preset control method based on the electric power information and other different pieces of information. The configuration of the energy management system 30 may be applied to the smart controller 40 and the smart meter 20 in a similar fashion.

As described with reference to FIG. 2, the air conditioner 100 may be connected to the electric power supply sources 50 and 60, the smart meter 20, and the energy management system 30 to interact therewith. The air conditioner 100 may include a controller 101 that receives instructions and operation related information transmitted to the air conditioner 100 so as to control operation of the air conditioner 100. The controller 101 may also receive instructions from the energy management system 30. The smart controller 40 may be provided as a part of the air conditioner 100 and the air conditioner 100 may receive instructions directly from the smart controller 40. Alternatively, as shown in a dashed square, the smart controller 40 may be physically integrated with the controller 101 into one microprocessor, as a so called smart chip, such that the controller 101 itself becomes the smart controller 40.

Thus, in certain embodiments, the controller 101, i.e., the integrated smart controller 40, can perform all of the functions of the smart meter 20 and the energy management system 30 described above, with a single device. That is, the controller 101 may measure the used wattage and costs incurred based on the power rates and used wattage, may receive the wattage and the power rates, and may provide the received and measured information to the user. The controller 101 may also directly control the operation of the domestic appliance in accordance with a preset control method based on the received and measured information. Accordingly, by using the smart controller 40 or the integrated controller 101, the electric power management network 10 may be managed even without the smart meter 20 and the energy management system 30, whose functions are provided instead by these components.

The air conditioner 100 may also include a power source 102 that supplies electric power to the air conditioner 100. An input device 103 directly receives user input operational instructions, and may correspond to a control panel of the air conditioner 100. The communication device 104 connects the air conditioner 100 to other elements in the smart grid for receiving different pieces of information and instructions. The communication device 104 may include a receiver for receiving the external and internal electric power information and other different pieces of information, and a transmitter for transmitting a control signal based on the information received and other information. The communication device 104 may communicate with other elements in the smart grid in various methods similar to those discussed above with respect to the communication device 33 of the energy management system 30. A sensor 105 may sense operation related conditions, such as, for example, an operation state, a temperature, a humidity, and other such conditions of the air conditioner 100. The display 106 may include a display panel for displaying not only the operation related information of the air conditioner 100, but also different pieces of electric power information.

The air conditioner may include a compressor 107 that draws in evaporated low temperature, low pressure gaseous refrigerant, raises a pressure of the refrigerant up to a saturation pressure which is equivalent to a condensing temperature of the refrigerant, and discharges high temperature, high pressure refrigerant. In a cooling mode, an outdoor heat exchanger 108 removes heat from the gaseous refrigerant, so that the gaseous refrigerant is condensed into high temperature, high pressure liquid refrigerant, and the outdoor heat exchanger 108 is operated as a condenser in the cooling mode. In a heating mode, the outdoor heat exchanger 108 absorbs heat from the refrigerant, and serves as an evaporator in the heating mode. An expansion valve 109 converts the liquefied high temperature, high pressure refrigerant into low temperature, low pressure refrigerant. An indoor heat exchanger 110 may opposite to the outdoor heat exchanger 108. That is, in the cooling mode the indoor heat exchanger 110 serves as an evaporator, and in the heating mode, the indoor heat exchanger 110 serves as a condenser. A first fan 111 blows air to the outdoor heat exchanger 108, and a second fan 112 blows cooled or heated air toward the room space.

As shown in FIG. 5, the compressor 107, the outdoor heat exchanger 108, and the first fan 111 may be housed in an outdoor unit 130, and the indoor heat exchanger 110 and the second fan 112 may be housed in an indoor unit 140. Since the outdoor unit 130 emits a relatively large amount of noise, in general, the outdoor unit 130 may be installed outdoors. The indoor unit 140 may be installed indoors for supplying cooled or heated air directly to the room. In certain embodiments, the outdoor unit 130 and the indoor unit 140 may be separated from each other. In alternative embodiments, the outdoor unit 130 and the indoor unit 140 may be integrated as a single unit. As shown in FIG. 5, at least one indoor unit 140 may be installed in each of a plurality of rooms. For efficient room cooling or heating, the indoor unit 140 may be installed on a ceiling, or may be installed on a part other than the ceiling. In more detail, as shown in FIG. 5, the indoor unit 140 may include an outlet 141 for discharging cooled or heated air to the room. The indoor unit 140 may also include a supplementary sensor 142 for sensing a number of persons in the room.

Figure 6:
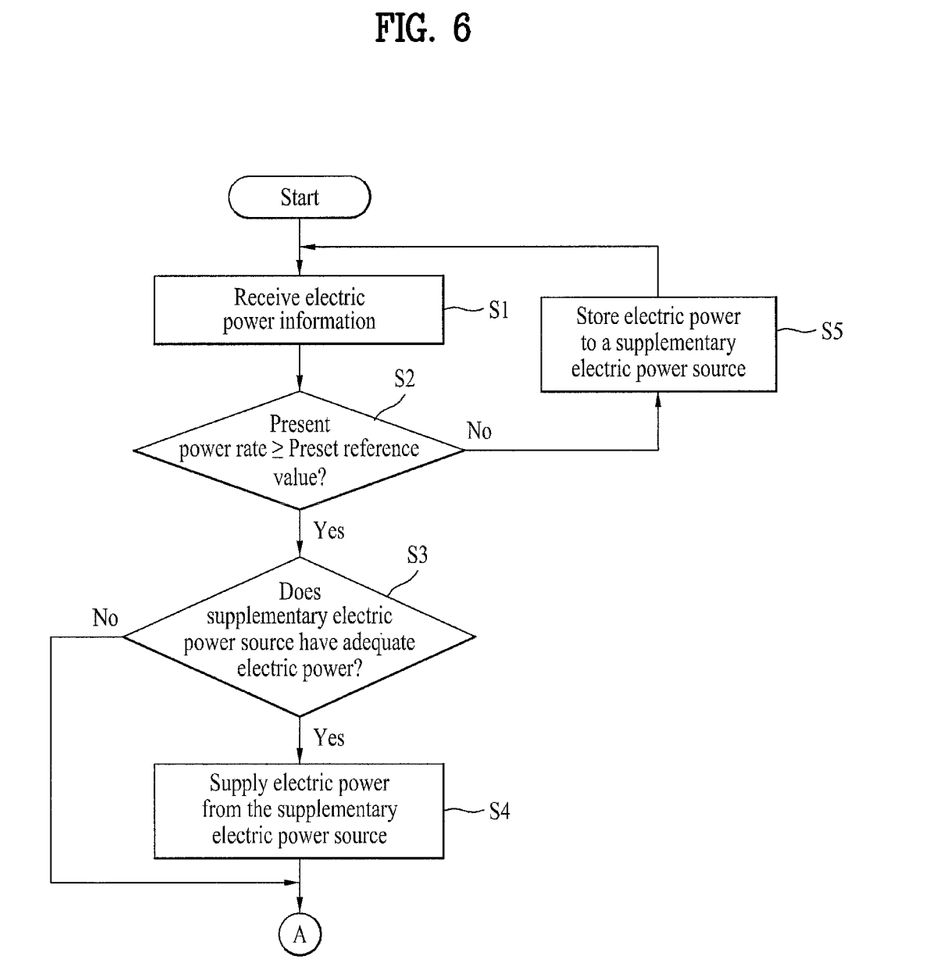
FIGS. 6 and 7 are flow charts of a method for controlling an air conditioner in accordance with an embodiment as broadly described herein.

FIG. 6 is a flow chart of a method for controlling an air conditioner in accordance with an embodiment as broadly described herein.

This control method may make use of the smart controller 40 which is a part of the appliance itself, or provided as a stand-alone device, or integrated with the controller of the appliance. This control method may be performed by, not only the smart meter 20 and energy management system 30, but also a controller of, for example, the air conditioner.

First, the air conditioner 100 receives the electric power information (S1). In particular, the smart controller 40 receives the electric power information. The electric power information may include, for example, the actual wattage (including the wattage used by the air conditioner itself) used by the domestic appliances measured by the smart controller 40 and the power rates to be charged based on the wattage used. The power rates are an important parameter in determining/suppressing use of the electric power, and consequently, the control of the air conditioner will be described with reference to the power rates.

In more detail, the air conditioner receives the electric power information from the electric power company 50 (S1). In this step, the smart controller 40 receives the electric power information including the power rates and other different pieces of information. The power rate may be a rate (cost) per a predetermined unit time period, or a predetermined unit of power/energy, and, as described above, the power rate per unit time period may vary based on total electric power demand and electric power production. In general, the power rate per unit time period may be, for example, an hourly power rate, but the predetermined unit time period may be increased or decreased as appropriate for a particular application.

The electric power information may be received by the smart controller 40 in real time. The smart controller 40 may receive a table containing the electric power information at a predetermined time period. That is, such a table may contain power rates per unit time period that are different from one another based on a particular predetermined time period. An electric power provider, for example, the electric power company, may forecast the electric power demand and the electric power production, and generate a table containing power rates per unit time period that are different from one another depending on the time period, i.e., a pricing schedule, in advance, and provide the schedule to the consumers. In general, though the table may include, for example, daily power rates, the table may include power rates per unit time period that are longer or shorter than one day.

After receiving the electric power information (S1), the smart controller 40 of the air conditioner extracts required information from the received electric power information. In more detail, the smart controller 40 extracts power rate information from the received electric power information. Similarly, other different pieces of information included in the received electric power information may be extracted by the smart controller 40.

The air conditioner 100 then determines whether the present power rates (extracted from the received electric power information) are greater than or equal to a reference power rate or not (S2). That is, the smart controller 40 determines whether the present power rates per unit time period are greater than or equal to a preset reference power rate. The reference power rate may be, for example, an average of all power rates (i.e., all power rates per unit time period) for a past predetermined time period (for example, one week or one month). Alternatively, the reference power rate may be an average of relevant power rates per unit time period for a past predetermined time period. Therefore, if the present power rates are greater than or equal to the reference power rate, it means that the present power rates are relatively expensive. If the present power rates are less than the reference power rate, it means that the present power rates are relatively inexpensive.

If it is determined that the present power rates are less than the predetermined reference power rate (S2), as described before, the smart controller 40 determines that the present power rates are relatively inexpensive and maintains current operation of the air conditioner.

If the present power rate is greater than or equal to the predetermined reference power rate, the smart controller 40 determines that the present power rate is relatively high. Based on this, the air conditioner 100 supplies electric power produced by the supplementary electric power source to a component which uses low electric power (S4).

Basically, in order to reduce operating cost during the time period in which the power rate is relatively high, use of electric power may be suppressed or reduced. Such suppression or reduction of electric power consumption may be achieved by partial reduction of the performance of the air conditioner or partial restriction of the operation of the air conditioner. To suppress the use of electric power by optimal control while maintaining substantially the same performance of the air conditioner, in the supply step S4, the smart controller 40 supplies electric power from the supplementary electric power source 60 to the air conditioner 100 together with the electric power supplied from an external source, for example, electric power from the electric power company 50, during the time period in which the power rate is high.

As described already, the electric power provided from an external source, i.e., from the electric power company 50 has a variable power rate. In contrast, as shown in FIGS. 2 and 3, the supplementary electric power device 60 may be a non-utility generation unit 61, such as photovoltaic and/or wind power stations, or a fuel cell 62 provided locally. And, the supplementary electric power source 60 may include a battery, i.e., a charger 63 which may receive and store electric power produced from the non-utility generation unit 61. Accordingly, the electric power from the supplementary electric power source 60 is essentially cost free. Therefore, by supplying electric power from the supplementary electric power source 60, the use of paid electric power may be reduced.

However, since the non-utility generation unit 61 uses renewable energy, electric power production thereof is not consistent. Moreover, the charger 63 or the fuel cell 62 may have a relatively small chargeable wattage, so that the electric power supply from the supplementary electric power source 60 may be somewhat limited. Thus, supply of electric power from the supplementary electric power source 60 to all of the elements of the air conditioner 100 including the compressor 107, which requires much more electric power, is liable to make operation of the air conditioner 100 unstable. Therefore, in the supplying step S4, the electric power from the supplementary electric power source 60 may be supplied to components which use lower amounts of electric power. Thus, the smart controller 40 first determines whether the supplementary electric power source 60 has adequate electric power (S3).

In more detail, the smart controller 40 determines whether the electric power stored at or to be produced from the supplementary electric power source 60 is sufficient to operate the component which uses low electric power during the time period in which the present (relatively high) power rate is applied. If the smart controller 40 determines that the supplementary electric power source 60 has an adequate electric power supply, the smart controller 40 supplies the components which uses low electric power according to the supplying step S4 described before. If the smart controller 40 determines that the supplementary electric power source 60 has an inadequate electric power supply capability, the air conditioner, i.e., the smart controller 40 does not carry out the supplying step S4, but instead carries out another method which may reduce use of electric power. The determining step S3 may prevent unstable operation of the air conditioner liable to take place due to use of the supplementary electric power source 60.

The component which uses low electric power may be a component which has an electric power requirement which is lower than a preset reference power requirement. In more detail, in the air conditioner, since the compressor 107 requires the greatest amount electric power and is required to maintain stable operation, the component of the air conditioner which uses low electric power has an electric power requirement that is smaller than the electric power requirement of the compressor. For example, the component of the air conditioner which uses low electric power may include the display 106, an alarm, sensors 105 and 142 and the fans 111 and 112.

If the present power rate is below the preset reference value in the determining step S2, the present power rate may be considered relatively low. Accordingly, the smart controller 40 may direct and store electric power to the charger 63 of the supplementary electric power source 60 for later use, during the time period in which the power rate is high.

In this control method, the partial replacement of external electric power, which has an associated cost, with power from the supplementary electric power source 60 during the time period in which the power rate may reduce use of paid electric power. Since the use of the supplementary electric power source 60 is somewhat limited to components which use low electric power, the air conditioner operate stably even during the period in which the supplementary electric power source 60 is used. And, since the level of electric power to the air conditioner is maintained, the air conditioner maintains the same performance during the period when the supplementary electric power source 60 is used. As a result of this, power cost may be saved, and energy efficiency may be increased without loss of performance or unstable operation.

As described before, though the suppression or reduction of the use of electric power may be achieved by optimal control, such as use of the supplementary electric power source, while maintaining the same performance level, the partial reduction or partial restriction of operation of the air conditioner may be more effective reduction of the use of the electric power. Therefore, for a greater reduction in the use of electric power, a control method based on a reduced performance level and restricted operation is shown in FIG. 7.

An air conditioning state of a particular room space may be sensed by the occupants therein, and thus the occupants of the room space being air conditioned may be taken into consideration, particularly when the performance of the air conditioner may be reduced or operation of the air conditioner may be restricted to reduce operating cost. Accordingly, in the following control method, the number of occupants of the room space may be determined, and control may be performed based on the determined number occupants. And, the control method according to the number of occupants may be performed together with the supplying step S4 shown in FIG. 6, or, alternatively, independently. That is, in the adequate supplementary electric power source determining step S3 shown in FIG. 6, if the smart controller 40 determines that the supplementary electric power source 60 has an adequate electric power supply capability, the control method shown in FIG. 7 may be performed in addition to the supplying step S4 shown in FIG. 6. If the smart controller 40 determines that the supplementary electric power source 60 has an inadequate electric power supply capability, the control method shown in FIG. 7 may be performed, directly.

Figure 7:
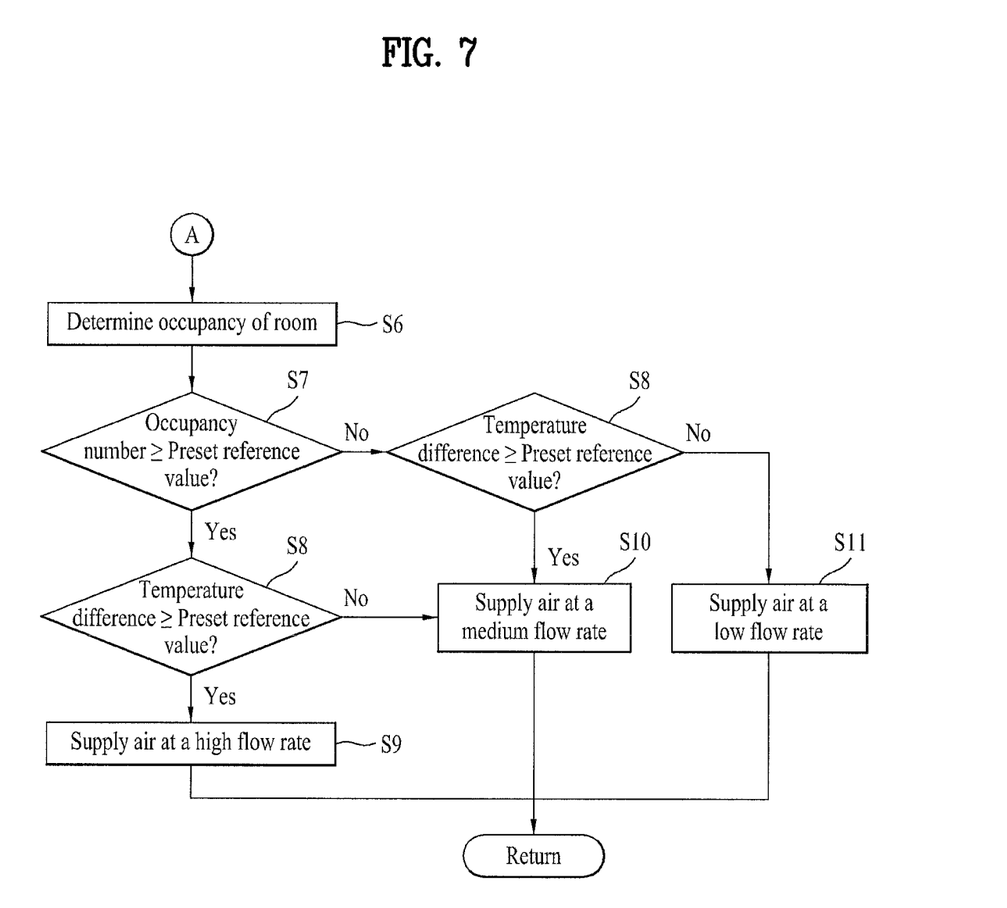

Referring to FIG. 7, if the present power rate is higher than the preset reference value in the determining step S2 shown in FIG. 6, the smart controller 40 determines that the present power rate is relatively high, and the air conditioner determines a number of occupants in each of the room spaces which require air conditioning (S6).

In the determining step S6, the user may input the number of occupants in the room space directly into the air conditioner using the input device 103 provided on the control panel. In more detail, if the present power rate is higher than the reference power rate, the smart controller 40 may request the user to input the number of persons in the room space requiring air conditioning by using a character or sound through the display 106. If the user inputs the number of persons in the room space to the air conditioner directly, the smart controller 40 of the air conditioner uses the input number of persons for subsequent control. On the other hand, the smart controller 40 may request the user to input a number of persons in the room space at a time at which air conditioning is initiated in at least one of the room spaces.

Or, in the determining step S6, the smart controller 40 may sense and determine a number of persons in the room space automatically using the supplementary sensor 142. The supplementary sensor 142 may include, for example, an infrared sensor, a heat source sensor, or a camera, and other sensors that can sense sources of heat and/or motion indicative of persons. In more detail, the infrared sensor may sense movement in the room space, and based on the movement, may determine the number of occupants. The heat source sensor may sense a number of heat sources in the room space and, based on the number of the heat sources, may determine the number of occupants. The camera may have a CCD (Charge Coupled Device) camera that obtains an image of the room space, and by analyzing the image, may determine the number of occupants.

After determining the number of occupants, the air conditioner 100 determines whether the determined number of persons is greater than a preset reference number or not in each of the room spaces S7. For example, if there are more than three persons in one of a plurality of room spaces, it may be considered that the room space accommodates a large number of persons, and requires air conditioning prior to other room spaces. Thus, in the determining step S7, the reference number of persons may be set to 3.

Therefore, in the determining step S7, if the number of persons in any one of the room spaces is greater than the preset number of persons, the room space is air conditioned to reach to a target temperature (a preset temperature) prior to other room spaces. In a case of room cooling, the room space has cold air supplied thereto from the indoor unit 140 to reach to the target temperature, and in a case of room heating, the room space has hot air supplied thereto from the indoor unit 140 to reach to the target temperature.

As previously discussed, the compressor 107 requires more electric power for operation and control of the air conditioner, while the second fan 112 consumes a relatively small amount of electric power. Since the second fan 112 is provided to each of the indoor units 140 in the room spaces, in individual control of the air conditioning of each of the room spaces, use of the second fan 112 may be favorable. Thus, in the determining step S7, if the number of persons in a predetermined room space is more than the preset number of persons, the smart controller 40 may control an air flow rate to the room space by controller the second fan 112 such that the room space reaches the target temperature within a short time period. The air flow rate may be controlled by controlling a rotation speed of the second fan 112. That is, if the second fan 112 rotates at a high speed, a high flow rate of air can be supplied to the room space, and if the second fan 112 rotates at a low speed, a low flow rate of air can be supplied to the room space. Accordingly, in controlling the air flow rate, if the air flow rate is increased, a greater amount of cold or hot air can be supplied from the indoor unit 140 per unit time period, enabling the room space to reach to the target temperature quickly. In a case in which the air conditioner has not yet started operating, in order to increase the air flow rate thus, the indoor unit 140 may supply air at a higher flow rate initially. In a case in which the air conditioner is already in operation, the indoor unit 140 can supply air at a flow rate higher than the present flow rate. In contrast, if the number of persons in any one of the room spaces is below the preset number of persons, the smart controller 40 may supply air to the room space at a relatively low flow rate.

In order to control the flow rate of the air more accurately according to the number of persons, the flow rate of air to the indoor unit 140 may be classified as a high flow rate, a medium flow rate and a low flow rate. The high flow rate denotes a flow rate at which more air is blown per unit time period than the medium flow rate, and the medium flow rate denotes a flow rate at which more air is blown per unit time period than the low flow rate. That is, the indoor unit 140 of the air conditioner may selectively supply air to the room space at three incremental flow rate levels.

Therefore, if the number of persons in any one of the room spaces is greater than the preset number of persons, the indoor unit 140 may provide the high flow rate of air to the room space (S9). If the number of persons is smaller than the preset number of persons, the indoor unit 140 may provide the medium or low flow rate of air to the room space (S10 and S11). Owing to such classified flow rates, the air flow rate may be controlled more accurately according to the number of persons, so that a room space having persons more than the preset number of persons reaches the target temperature prior to other (unoccupied) room spaces.

The air conditioner may then determine whether a difference between the target temperature for each of the room spaces and an actual/current temperature measured at each of the room spaces is greater than a preset value (S8). In the determining step S8, the sensor 105 senses the temperature of each of the room spaces, and then calculates the difference between the target temperature of each of the room spaces and the actual/current temperature thereof. Then, the smart controller 40 compares the temperature difference to a reference value. The temperature difference may indicate an extent of progress of the air conditioning of the room space. That is, if the temperature difference is great, it implies that the room space is not adequately air conditioned and requires more air conditioning. If the temperature difference is small, it implies that the room space is air conditioned almost to the target temperature. With regard to the extent of air conditioning, in certain embodiments, the reference value may be set to 5° C.

In more detail, if the number of persons determined in steps S7 and S8 is greater than the preset value, and the temperature difference is greater than the preset value, it implies that the room space has many occupants, and is not yet air conditioned adequately. Accordingly, the smart controller 40 increases the flow rate of air from the indoor unit such that the room space reaches the target temperature within a short period of time. Practically, in such a case, the indoor unit 140 supplies the air to the room space at the high flow rate (S9).

If the number of persons determined in steps S7 and S8 is greater than the preset value, and the temperature difference is smaller than the preset value, it implies that, though the room space has many occupants, the room space is air conditioned almost to the target temperature. If the number of persons is smaller than the preset value, and the temperature difference between the target temperature and the present temperature is greater than the preset value, it implies that the room space has a small number of occupants, and is not yet air conditioned adequately. Therefore, in those cases, in order to take both the number of persons and the extent of air conditioning into account, the indoor unit 140 supplies air to the room spaces at the medium flow rate (S10).

Finally, if the number of persons determined in steps S7 and S8 is smaller than the preset value, and the temperature difference between the target temperature and the present temperature is smaller than the preset value, it implies that the room space has a small number of occupants, and is air conditioned almost to the target temperature. Accordingly, in this case, the indoor unit 140 supplies air to the room space at the low flow rate (S11).

As described before, by also taking the extent of air conditioning, i.e., the temperature difference, into account, a room space to be air conditioned prior to other room spaces may be selected more accurately, and the flow rate of air may be selected more appropriately such that the room space may be air conditioner prior to other room spaces.

If it is determined that the room is not occupied the smart controller 40 may stop air conditioning operation for the room space, to prevent waste of electric power.

The control method of FIG. 7 controls air conditioning of the room space by controlling the flow rate of air to be supplied to the room space based on the number of occupants determined to be in the room. In more detail, the room space having a number of occupants greater than the preset number is air conditioned to reach to the target temperature prior to other room spaces by controlling the flow rate of air. Moreover, by taking an extent of air conditioning into account in addition to the number of occupants, the air conditioner can select the room space to be air conditioned prior to other room spaces more accurately. A high flow rate of air is supplied to the room space which is selected to be air conditioned with a higher priority, and a relatively low flow rate of air is supplied to other room spaces. Owing to such flow rate control, while use of electric power in the time period having a high power rate can be reduced significantly, the occupants do not perceive a change in the air conditioned performance. Accordingly, cost may be saved and energy efficiency may be increased significantly while not causing inconvenience to the user. Moreover, the supplementary electric power source may further reduce the use of electric power having an associated high cost.

In certain embodiments, if, for example, a flow rate is set to a normal, or reference flow rate, during normal operation, the flow rate may be increased from the reference flow rate (i.e., the flow rate may be changed to a flow rate that is greater than the reference flow rate) if the determined number of persons, or occupancy, is greater than the preset value and/or the temperature difference is greater than the preset value. Similarly, the reference flow rate may be maintained if the determined number of persons, or occupancy, is greater than the preset value and the temperature difference is less than the preset value, or if the determined number of persons, or occupancy, is less than the present value and the temperature difference is greater than the preset value. The flow rate may be decreased from the reference flow rate (i.e., the flow rate may be changed to a flow rate that is less than the reference flow rate) if the determined number of persons, or occupancy, is less than the preset value and/or the temperature difference is less than the preset value.

In an air conditioner and control method as embodied and broadly described herein, the partial replacement of costly external electric power with the supplementary electric power source during the time period in which the power rate is high may reduce use of paid electric power while maintaining the same performance.

Furthermore, a room space having more occupants than the preset number is air conditioned to reach the target temperature prior to other room spaces by controlling the flow rate of air thereto. Such air flow rate control may reduce use of electric power in a time period having a high power rate. Cost may be reduced and energy efficiency may be improved while not causing inconvenience to the user due to reduced performance.

It will be apparent to those skilled in the art that various modifications and variations can be made in the present application without departing from the spirit or scope of the applications. Thus, it is intended that the present application covers the modifications and variations of this application provided they come within the scope of the appended claims and their equivalents.

An air conditioner and a method for controlling the same are provided.

An air conditioner and method of controlling the same are provided in which use of power is controlled properly under a variable power rate.

A method as embodied and broadly described herein may include perceiving electric power related information, determining whether the present power rate included to the perceived information is higher than a preset reference value or not, and supplying electric power from a supplementary electric power source to a unit which uses low electric power if it is determined that the present power rate is higher than the preset reference value.

Perceiving electric power related may include the air conditioner receiving the electric power related information from an electric power company, the electric power related information includes information on power rate per a predetermined unit time period. Perceiving electric power related information may include the air conditioner receiving the electric power related information in real time, or in a table containing the electric power related information for a preset predetermined time period.

The unit which uses low electric power may be a unit which has a power requirement lower than a preset reference, and more specifically, the unit which uses low electric power may be a unit which has a power requirement lower than a power requirement of a compressor of the air conditioner. The unit which uses low electric power may include a display unit, an alarm unit, a sensing unit and fans of the air conditioner.

The supplementary electric power source may be a non-utility generation unit installed in a home for producing electric power from renewable energy, and may be a charge unit for having a preset wattage charged thereto.

The method may also include storing electric power to the charge unit of the supplementary electric power source if the present power rate included to the perceived information is lower than the preset reference value.

The method may also include perceiving a number of persons in a room space which requires air conditioning if the present power rate is determined to be higher than the preset reference value, and controlling a flow rate of air being supplied to the room space based on the perceived number of persons.

In this case, the method may also include determining whether the electric power stored at or to be produced from the supplementary electric power source can operate the unit which uses low electric power or not during a time period in which the present power rate is applied, which is determined to be higher than the preset reference value before the step of supplying the supplementary electric power source, and if it is determined that the electric power of the supplementary electric power source is inadequate for operating the unit which uses low electric power during the time period, perceiving a number of persons and controlling a flow rate are performed instead of supplying the supplementary electric power source.

Controlling a flow rate may include controlling the flow rate of air such that a target temperature is reached within a short time period if the perceived number of persons is greater than the preset reference value, and may also include the step of increasing the flow rate of the air provided from an indoor unit of the air conditioner if the perceived number of persons is greater than the preset reference value.

Controlling a flow rate may include setting the flow rate of air provided from the indoor unit of the air conditioner to a high flow rate, a medium flow rate or a low flow rate.

Controlling a flow rate may include providing the air to the room space at the high flow rate if the perceived number of persons is greater than the preset reference value, and may include providing the air to the room space at the medium or low flow rate if the perceived number of persons is smaller than the preset reference value.

The method may also include determining whether a temperature difference between the target temperature and the preset temperature of the room space is greater than a preset value or not after perceiving a number of persons, and in this case, controlling a flow rate may include increasing the flow rate of the air provided from an indoor unit of the air conditioner such that the target temperature is reached within a short time period if the perceived number of persons is greater than the preset reference value and the temperature difference between the target temperature and the present temperature is greater than the preset value.

In more detail, controlling a flow rate may include providing the high flow rate of air to the room space if the perceived number of persons is greater than the preset reference value and the temperature difference between the target temperature and the present temperature is greater than the preset value.

And, controlling a flow rate may include providing the medium flow rate of air to the room space if the perceived number of persons is greater than the preset reference value and the temperature difference between the target temperature and the present temperature is smaller than the preset value, or if the perceived number of persons is smaller than the preset reference value and the temperature difference between the target temperature and the present temperature is greater than the preset value.

And, controlling a flow rate may include providing the low flow rate of air to the room space if the perceived number of persons is smaller than the preset reference value and the temperature difference between the target temperature and the present temperature is smaller than the preset value.

The method may also include stopping air conditioning operation for the room space if it is perceived that there are no persons in the room space in the perceiving step.

Alternatively, in another embodiment as broadly described herein, an air conditioner may include a supplementary electric power source provided to a home for producing electric power in addition to electric power supplied from an electric power company, a receiver for receiving electric power related information, and a controlling device for receiving the present power rate and electric power from the receiver and the supplementary electric power source respectively and supplying the electric power from the supplementary electric power source to a unit which uses low electric power if it is determined that the present power rate is higher than a preset reference value.

The receiver may receive the electric power related information from an electric power company, and the electric power related information may include information on the power rate per a predetermined unit time period.

The unit which uses low electric power may be a unit which has a power requirement lower than a preset power requirement, and more specifically, a power requirement of a compressor of the air conditioner. The unit which uses low electric power may include a display unit, an alarm unit, a sensing unit and fans of the air conditioner.

The supplementary electric power source may be a non-utility generation unit installed in a home for producing electric power from renewable energy, and can be a charge unit for having a preset wattage charged thereto.

The controlling device may store electric power to the charge unit of the supplementary electric power source if the present power rate included to the perceived information is lower than the preset reference value.

And, the controlling device may perceive a number of persons in a room space which requires air conditioning if the present power rate is determined to be higher than the preset reference value, and may control a flow rate of air being supplied to the room space based on the perceived number of persons.

Furthermore, the controlling device may determine whether the electric power stored at or to be produced from the supplementary electric power source can operate the unit which uses low electric power or not during a time period in which the present power rate is applied, which is determined to be higher than the preset reference value before supplying the electric power from the supplementary electric power source, and if it is determined that the electric power of the supplementary electric power source is inadequate for operating the unit which uses low electric power during the time period, the controlling device may perceive a number of persons and controls a flow rate without supplying the electric power from the supplementary electric power source.

The controlling device may control the flow rate of air such that a target temperature is reached within a short time period if the number of persons is greater than the preset reference value, and furthermore, may increase the flow rate of the air provided from an indoor unit of the air conditioner if the number of persons is greater than the preset reference value.

The controlling device may set the flow rate of the air provided from the indoor unit of the air conditioner to a high flow rate, a medium flow rate or a low flow rate.

The controlling device may control the indoor unit of the air conditioner to provide the air to the room space at the high flow rate if the number of persons is greater than the preset reference value, and may control the indoor unit of the air conditioner to provide the air to the room space at the medium or low flow rate if the number of persons is smaller than the preset reference value.

The controlling device may determine whether a temperature difference between the target temperature and the present temperature of the room space is greater than a preset value or not, and in this case, the controlling device may increase the flow rate of the air provided from an indoor unit of the air conditioner such that the target temperature is reached within a short time period if the number of persons is greater than the preset reference value and the temperature difference between the target temperature and the present temperature is greater than the preset value.

In more detail, the controlling device may control the indoor unit of the air conditioner to provide the high flow rate of air to the room space if the perceived number of persons is greater than the preset reference value and the temperature difference between the target temperature and the present temperature is greater than the preset value.

And, the controlling device may control the indoor unit of the air conditioner to provide the medium flow rate of air to the room space if the number of persons is greater than the preset reference value and the temperature difference between the target temperature and the present temperature is smaller than the preset value, or if the number of persons is smaller than the preset reference value and the temperature difference between the target temperature and the present temperature is greater than the preset value.

And, the controlling device may control the indoor unit of the air conditioner to provide the low flow rate of air to the room space if the number of persons is smaller than the preset reference value and the temperature difference between the target temperature and the present temperature is smaller than the preset value.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing electric power to a plurality of appliances, the method comprising:
    determining whether a current power rate is greater than a preset reference power rate; and
    selectively supplying electric power to the plurality of appliances from either a primary external power supply source or a supplementary power supply source based on operational power requirements of the plurality of appliances in operation after the determination of whether the current power rate is greater than the preset reference power rate is made, wherein selectively supplying electric power comprises:
        supplying electric power from the primary external power supply source to an air conditioner when the current power rate is less than the preset reference power rate; and
        supplying electric power from the primary external power supply source to a compressor of the air conditioner, and supplying electric power from the supplementary power supply source to at least one component of the air conditioner having a power requirement that is lower than a power requirement of the compressor when the current power rate is greater than the preset reference power rate.

2. The method of claim 1, further comprising receiving electric power information that includes the current power rate from the primary external power supply source.

3. The method of claim 2, wherein receiving electric power information comprises receiving the electric power information in real time from the primary external electric power supply source, or accessing the electric power information from a previously stored table.

4. The method of claim 1, wherein the at least one component of the air conditioner comprises at least one of a display, an alarm, a sensor, or one or more fans of the air conditioner.

5. The method of claim 1, further comprising collecting electric power at the supplementary power supply source if the current power rate is lower than the preset reference power rate.

6. The method of claim 5, wherein collecting electric power at the supplementary power supply source comprises storing electric power supplied by the primary external power supply source in a charging device of the supplementary power supply source when the current power rate is lower than the preset reference power rate.

7. The method of claim 1, further comprising:
    determining whether electric power available from the supplementary power supply source is sufficient to operate the at least one component having the power requirement that is lower than the power requirement of the compressor when the current power rate is higher than the preset reference power rate before supplying power from the supplementary power supply source; and
    if the power available from the supplementary power supply source is not sufficient, determining a number of persons in a space to be air conditioned, and controlling a flow rate of air supplied from the air conditioner into the space.

8. The method of claim 7, wherein controlling a flow rate increasing the flow rate of air from a reference flow rate if the determined number of persons is greater than a preset reference number.

9. The method of claim 7, further comprising determining whether a difference between a target temperature and an actual temperature of the space is greater than a preset temperature difference after determining the number of persons in the space.

10. The method of claim 9, wherein controlling a flow rate comprises providing a high flow rate to the space if the determined number of persons is greater than the preset reference number and the temperature difference is greater than the preset temperature difference.

11. The method of claim 9, wherein controlling a flow rate comprises providing a medium flow rate if the number of persons is greater than the preset reference number and the temperature difference is smaller than the preset temperature difference, or if the number of persons is smaller than the preset reference number and the temperature difference is greater than the preset temperature difference.

12. The method of claim 9, wherein controlling a flow rate comprises providing a low flow rate if the number of persons is smaller than the preset reference number and the temperature difference is smaller than the preset temperature difference.

13. The method of claim 1, wherein selectively supplying electric power comprises:
    determining an occupancy of a space to be air conditioned; and
    controlling a flow rate of air supplied from the air conditioner into the space based on the determined occupancy when power available from the supplementary power supply source is less than a preset reference power requirement.

14. The method of claim 13, wherein controlling a flow rate of air comprises increasing the flow rate of air from a reference flow rate if the determined occupancy is greater than a preset reference occupancy value, and decreasing the flow rate of air from the reference flow rate if the determined occupancy is less than the preset reference occupancy value.

15. The method of claim 13, wherein controlling a flow rate of air comprises providing a high flow rate of air to the space if the determined occupancy is greater than a preset reference occupancy value, and providing a low flow rate of air to the space if the determined occupancy is less than the preset reference occupancy value.

16. An air conditioner connected to a plurality of other appliances in a network, comprising:
an outdoor unit and at least one indoor unit connected to the outdoor unit so as to air condition at least one corresponding space, the outdoor and indoor units being configured to receive power from a primary or a supplementary power source, wherein at least one of the outdoor unit or the at least one indoor unit receives power from the supplementary electric power source if a current power rate is greater than a preset reference power rate; and
a controller configured to selectively supply electric power from the primary electric power source and the supplementary electric power source to the outdoor unit and at least one indoor unit and the plurality of other appliances based on respective operational power requirements thereof when the current power rate is greater than the preset reference power rate,
wherein the controller is configured to supply power from the primary electric power source to the air conditioner when the current power rate is lower than the preset reference power rate, and
wherein the controller is configured to supply power from the primary electric power source to a compressor of the air conditioner and configured to supply power from the supplementary power source to at least one component of the air conditioner having a power requirement that is lower than a power requirement of the compressor when the current power rate is greater than the preset reference power rate.

17. The air conditioner of claim 16, wherein the controller is configured to supply power from the supplementary power source to at least one of a display, an alarm, a sensor, or one or more fans of the air conditioner.

18. The air conditioner of claim 16, wherein the supplementary power source is a local non-utility generation device that produces electric power from a renewable energy source.

19. The air conditioner of claim 16, wherein the supplementary power source is a charger having a preset wattage charged thereto.

20. The air conditioner as claimed in claim 16, wherein the controller is configured to direct electric power to a charger of the supplementary power source if the current power rate is lower than the preset reference power rate.

* * * * *